(12) United States Patent
Lavars

(10) Patent No.: US 6,276,510 B1
(45) Date of Patent: Aug. 21, 2001

(54) CONVEYOR LINK FOR MONORAIL CONVEYOR SYSTEM

(75) Inventor: Everett Lavars, Pomona, CA (US)

(73) Assignee: Sunkist Growers, Inc., Sherman Oaks, CA (US)

( * ) Notice: Subject to any disclaimer, the term of this patent is extended or adjusted under 35 U.S.C. 154(b) by 0 days.

(21) Appl. No.: 09/015,264

(22) Filed: Jan. 29, 1998

(51) Int. Cl.$^7$ .................................................. B65G 47/00
(52) U.S. Cl. ........................................................ 198/370.04
(58) Field of Search ............................... 198/370.04, 850

(56) References Cited

U.S. PATENT DOCUMENTS

| | | | |
|---|---|---|---|
| 4,031,998 | * 6/1977 | Suzuki et al. | 198/365 |
| 4,143,751 | * 3/1979 | Foster et al. | 198/365 |
| 4,961,489 | * 10/1990 | Warkentin | 198/365 |
| 4,993,535 | * 2/1991 | Scata | 198/365 |
| 5,018,928 | * 5/1991 | Hartlepp | 414/339 |
| 5,335,767 | * 8/1994 | Killer et al. | 198/365 |
| 5,477,955 | * 12/1995 | Madden et al. | 198/370.04 |
| 5,570,773 | * 11/1996 | Bonnet | 198/370.04 |
| 5,611,419 | * 3/1997 | LaVars | 198/370.04 |
| 5,632,589 | * 5/1997 | Bray et al. | 198/365 |
| 5,662,206 | * 9/1997 | Baum et al. | 198/370.04 |
| 5,878,863 | * 3/1999 | Madden et al. | 198/370.04 |
| 5,894,918 | * 4/1999 | Bonnet | 198/370.04 |
| 6,009,992 | * 1/2000 | Erceg et al. | 198/370.04 |

* cited by examiner

Primary Examiner—Christopher P. Ellis
Assistant Examiner—Khoi H. Tran
(74) Attorney, Agent, or Firm—Sheppard, Mullin, Richter & Hampton LLP; James R. Brueggemann

(57) ABSTRACT

The various embodiments of the spool link include a body of at least one piece, a drive ring functionally engaged to the body, and a cradle. The spool link body comprises at least a pair of engaged, spaced apart, substantially vertical side walls including structure thereon for rotatably engaging the drive ring and for engaging adjacent spool link bodies.

4 Claims, 7 Drawing Sheets

CONVEYOR LINK FOR MONORAIL CONVEYOR SYSTEM

BACKGROUND OF THE INVENTION

1. Field of the Invention

The present invention relates to spool links which are used in a monorail conveyor system, the spool links being of various configurations and each carrying a particular embodiment of a cradle for carrying an object such as a citrus fruit in an area between adjacent spool links, commonly referred to as the nest, with each cradle being actuable in at least one mode to operate as either an object ejector or as an object lifter. More specifically, the various spool link embodiments disclosed herein range in complexity from an embodiment having an one piece body to a multi-piece body, or a multi-piece cradle embodiment.

2. Description of the Prior Art

Conveyor systems for carrying objects such as citrus fruit typically have comprised various types of carriers driven along single or double rail systems, as shown in either U.S. Pat. No. 5,174,429 or U.S. Pat. No. 5,611,419. In the '419 patent, particular embodiments of a spool link for use in a monorail system are disclosed wherein a body portion is comprised of more than one piece, with particular embodiments of a cradle engaged to the body being disclosed as well.

As empirical testing of a monorail conveyor system such as that disclosed in the '419 patent has continued toward refinement, it has been found that a multiplicity of further embodiments for a spool link would be adaptable for use in such a monorail conveyor system. As will be described in greater detail hereinafter, the various embodiments for a spool link proposed herein provide an unique adaptability for the system in accommodating the sorting of a multiplicity of objects, such as the sorting of a multiplicity of citrus fruits.

SUMMARY OF THE INVENTION

The present invention discloses a plurality of embodiments for a spool link for a monorail conveyor system, with each of the embodiments being equally useful, with both a body of the spool link, as well as a cradle of the spool link being designed to accommodate sorting of a multiplicity of objects.

DESCRIPTION OF THE PREFERRED EMBODIMENT

Figure 1:
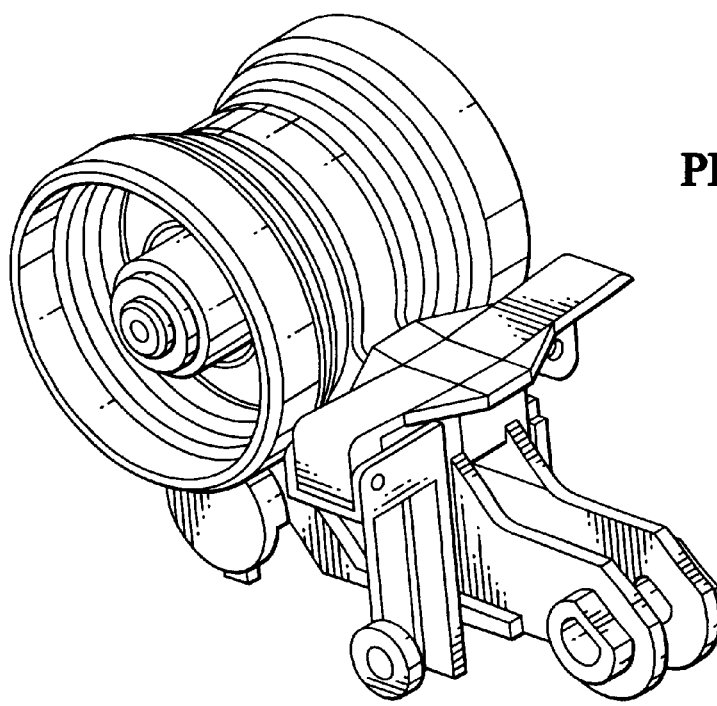
FIG. 1 is a perspective view of a prior art embodiment of a spool link.

Referring now to the drawings in greater detail, there is illustrated in FIG. 1 a prior art embodiment of a spool link as described in U.S. Pat. No. 5,611,419, the teachings of which are incorporated herein by reference.

Figure 2:
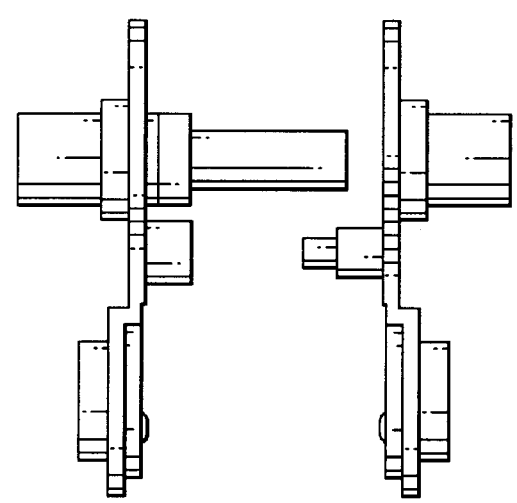
FIG. 2 is an exploded front elevational view of a prior art two piece embodiment of a spool link body.

FIG. 2 illustrates an exploded perspective view of the two piece body of the spool link of FIG. 1, also as disclosed in the '419 patent.

Figure 3:
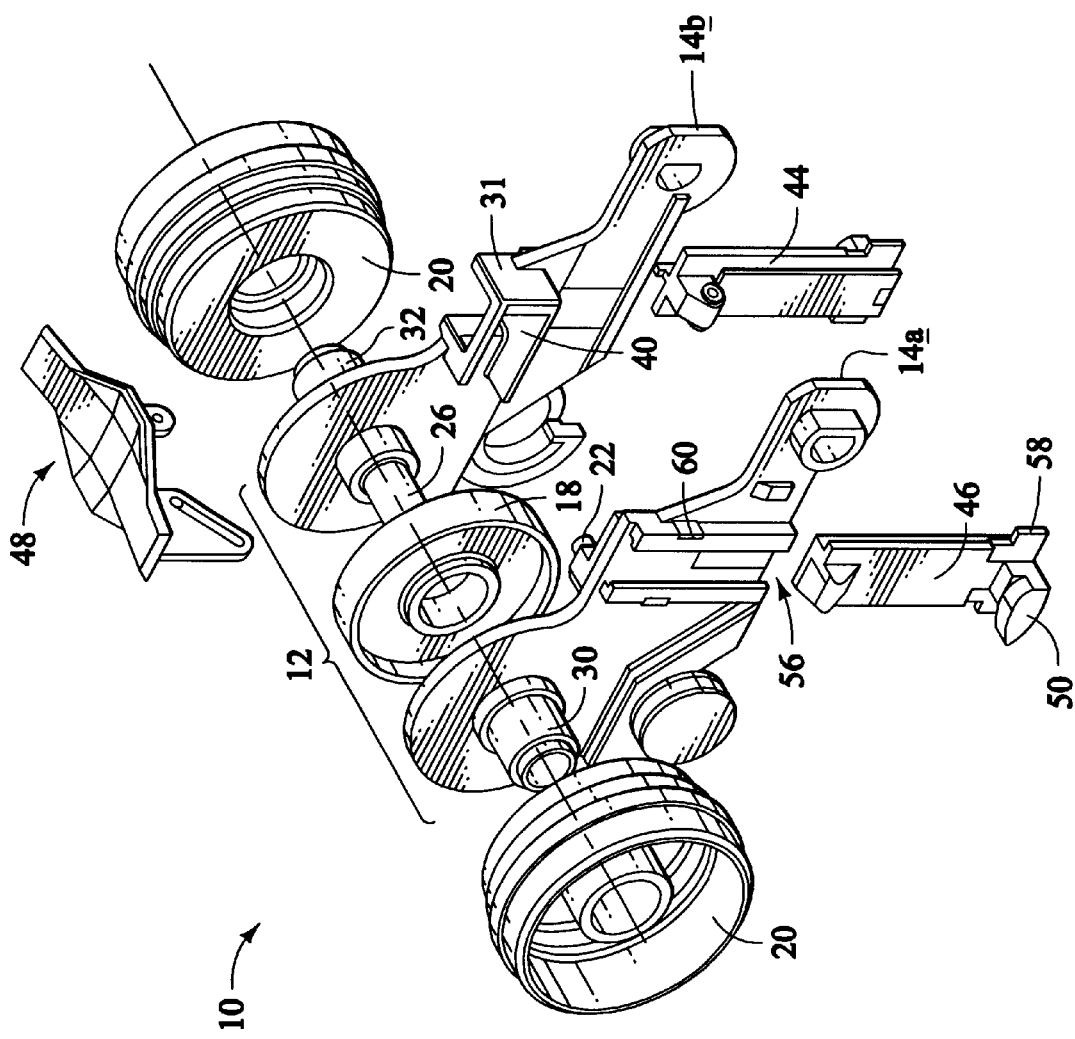
FIGS. 3 and 4 each present an exploded perspective view of a first embodiment of a spool link made in accordance with the teachings of the present invention.
Figure 4:
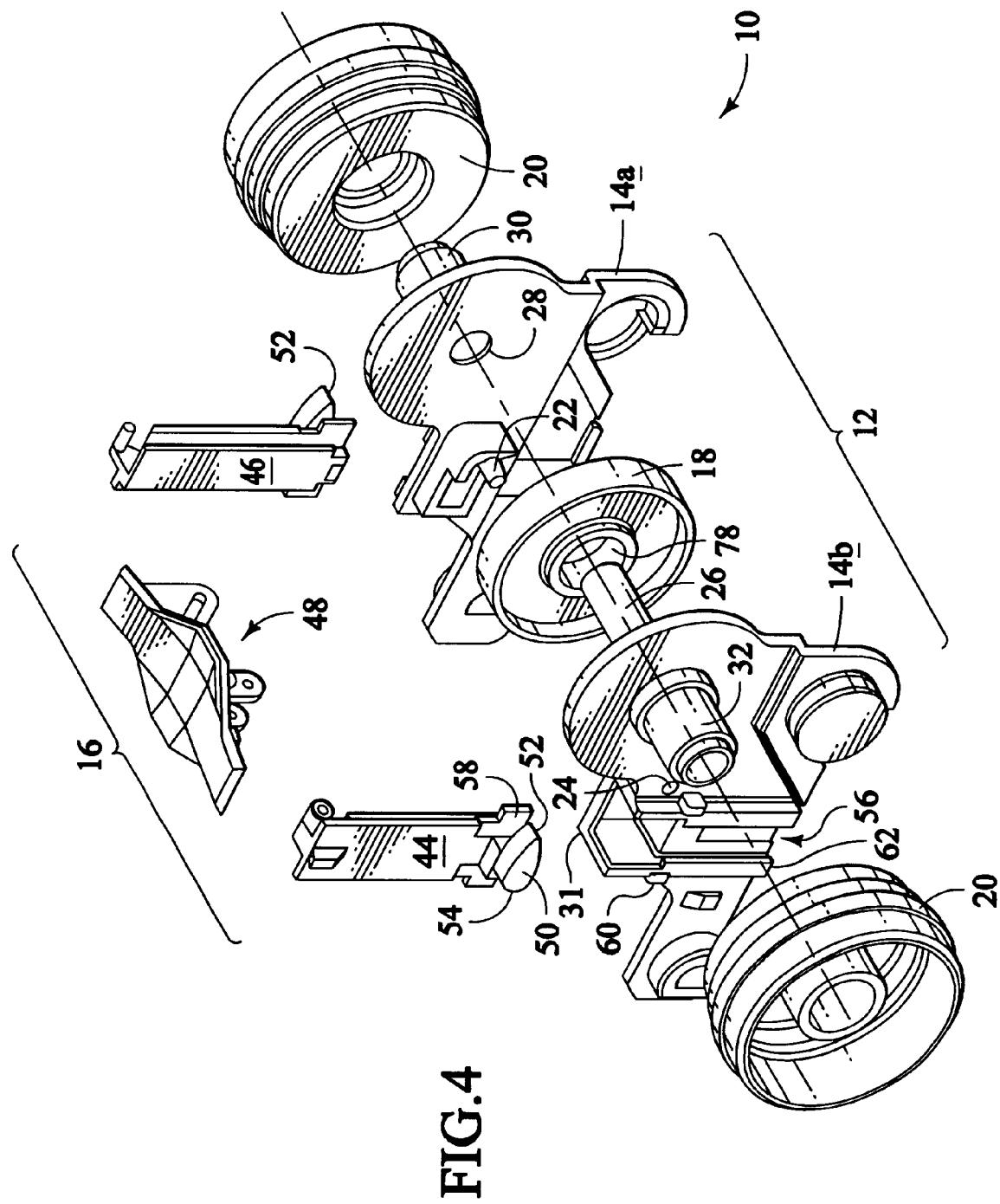

Turning now to FIGS. 3 and 4, there is illustrated therein a first embodiment of a spool link 10 made in accordance with the teachings of the present invention. This embodiment is substantially similar to that of the prior art.

In this respect, it will be appreciated that the spool link 10 basically constitutes a plurality of cooperating structures, namely, a body 12, here comprising two integrally molded side portions 14a and 14b, a cradle assembly 16, a center ring 18, and two spool hubs 20. Sides 14a and 14b fit together by means of a pin 22 of side 14a, extending into an aperture 24 of side 14b, and a pin 26 of side 14b extending into a cavity 28 defined within a pivot pin 30 of side 14a. It will also be seen that a spacer 31 engages between sides 14a and 14b.

Sides 14a and 14b are thus snugly secured together, while spool hubs 20 and center ring 1a are retained on pivot pins 32 and 30 by suitable locking structures.

Cradle assembly 16 is comprised of three pieces consisting of a first leg 44 and second leg 46 each coupled to a saddle 48 in known manner.

The contour of saddle 48 in this embodiment is best defined as cupped in transverse directions so that its lowest point creates a position of stability for a spherical object within a central region thereof, with substantially all space between successive spool hubs 20 being taken up by the structure of saddle 48.

Heretofore, a lower end of each cradle leg 44, 46 has been provided with a wheel by means of which the legs 44, 46 easily ride along an underlying surface of the monorail system, such surface including ramps or equivalent structures for causing vertical ascent of one or both legs 44, 46 simultaneously, as known.

In the present embodiment of the spool link 10, each wheel has been replaced with a skid 50 which is horizontally ovaled, having a pointed leading end 52 and a widened rounded trailing end 54, the pointed leading end 52 allowing the skid 50 to easily and smoothly engage a ramp (not shown).

Further to ensure against elevated disengagement between the legs 44, 46 and a vertical track 56 within which each travels, flanges 58 are provided at the lower end of each leg 44, 46 which engage against stops 60 positioned at a substantial elevation above a bottom end 62 of the track 56.

Although the body 12 of the spool link 10 is shown here to comprise two pieces 14a and 14b, this is not to be construed as limiting.

Figure 5:
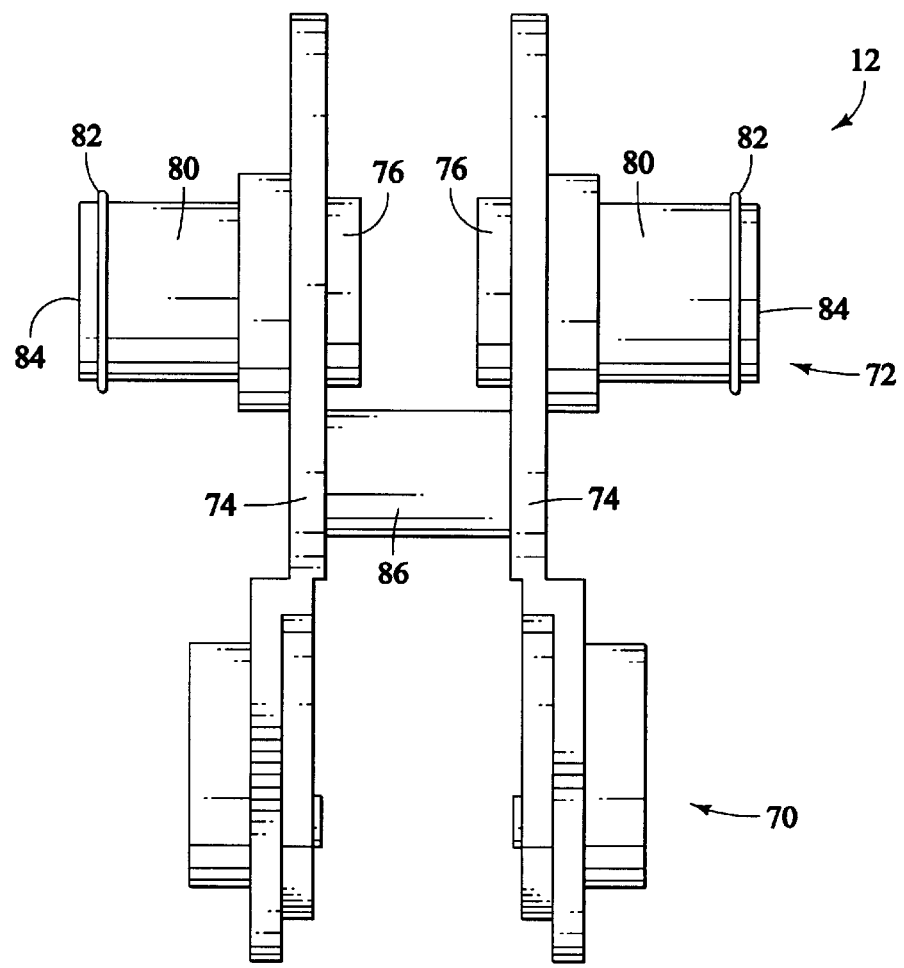
FIG. 5 is a front elevational view of a body of a spool link made in accordance with the teachings of the present invention.

In this respect, turning to FIG. 5, there is illustrated therein a body 12 which is of one piece construction.

The body 12 includes a lower chassis portion 70 and an upper spool portion 72.

Spool portion 72 has a generally circular shape to match the shape and diameter of the center ring 18 and spool hubs 20. Extending inwardly from each of two mirror image walls 74 of the body 12, in the spool portion 72, is an integral center pivot sleeve 76 over and between which the center ring 18 may be securely engaged in a snap fit manner. It will be understood that the low friction plastic material of the spool link 10 is resilient, allowing for a certain degree of flexibility. Thus, as the center ring 18 is pushed into the space between the walls 74 and over the pivot sleeves 76, the walls 74 flex outwardly until the sleeves 76 snap into and securely engage within a center bore 78 of the ring 18 (FIG. 4), in a manner allowing the ring 18 to rotate about the sleeves 76.

Further, extending outwardly from each wall 74 of spool portion 72 is a pivot pin 80 incorporating an annular rib 82 at a free end 84 thereof. A spool hub 20 is rotatably mounted to each pin 80 and is snap fittingly engaged and held in place thereupon by the rib 82. It will be understood that the sleeves 76 and pins 80 are aligned to create a single axis of rotation about which the center ring 18 and the two spool hubs 20 rotate.

Focusing now on lower chassis portion 70, it will be seen to incorporate an integrally molded spacer 86 between the walls 74, maintaining the walls 74 spaced apart in parallel alignment.

Further, it will be understood that the lower chassis portion 70 also incorporates structure for engaging the body 12 to the bodies of adjacent spool links 10 in known manner.

Figure 6:
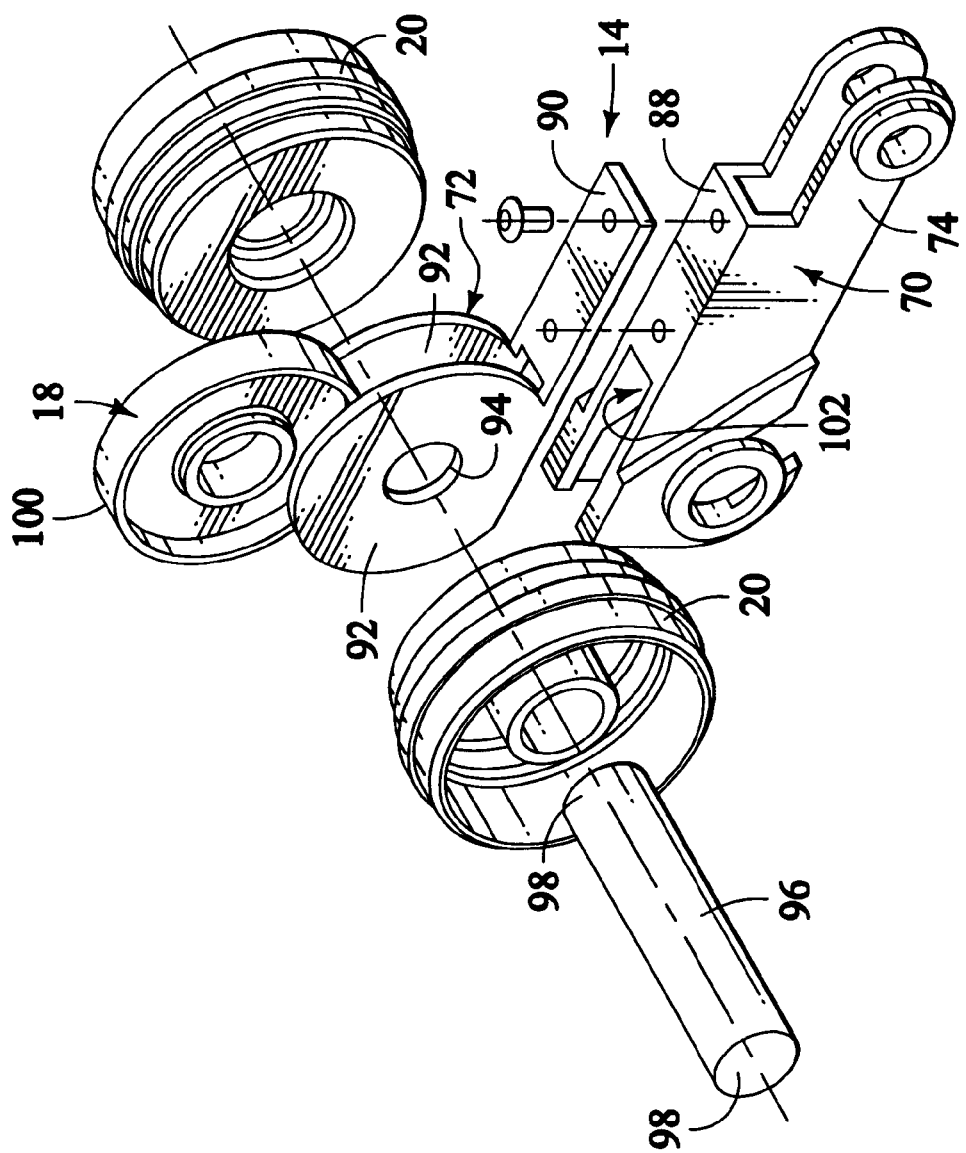
FIG. 6 is an exploded perspective view of a second embodiment of the spool link.

In FIG. 6, there is illustrated a further embodiment of a spool link 10. In this embodiment, a two piece body 14 including a spool portion 72 which is separate from and is fixed upon a lower chassis portion 70. The lower chassis portion 70 includes shortened sidewalls 74 which are spaced from one another by and depend from a horizontal platform 88 extending therebetween. The platform 86 comprises a substantially planar structure, upon and to which a tongue 90 of the spool portion 72, as well as any desired one of a plurality of embodiments of a saddle 48 may be engaged. The spool portion 72 includes structure for engaging a center drive wheel 18 of the link 10 and a spool hub 20, to either side thereof in a manner similar to that shown in FIGS. 3 and 4.

In this respect, the spool portion 72 includes two spaced apart upstanding side walls 92 forming a continuation of walls 74 rising upwardly from the tongue 90, toward a forward end of the spool link 10. A centered throughbore 94 is provided in each wall 92 through and within which a pivot pin 96 may extend. The pivot pin 96 engages the center ring 18 rotatably a spool thereon in an area between the walls 92, as well as rotatably engaging a spool hub 20 at each end 98 thereof, extending outwardly of the walls 92, the spool hubs being secured thereon in any suitable manner.

It will be understood that the center ring 18 must be engaged in a manner which not only allows for rotation thereof, but must also allow for engagement of a periphery 100 of the ring 18 upon a support surface therefor of the underlying monorail system (not shown). Thus, it may be necessary to create a cutout 102, substantially as shown, in the platform 88 through which the ring periphery 100 extends, to allow for necessary engagement of the ring periphery 100 with the underlying structure.

Turning now again to the lower chassis portion 70, it will be found that cradle engaging structures are notably missing. In this embodiment, the tongue 90 of the spool portion 72 may adequately serve as a cradle for objects of larger diameter.

Figure 8:
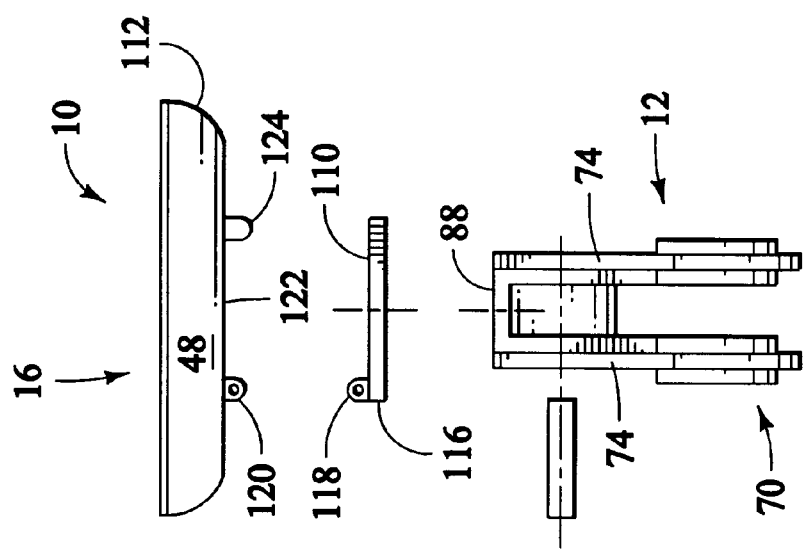
FIG. 8 is an exploded front elevational view of the spool link of FIG. 7.
Figure 7:
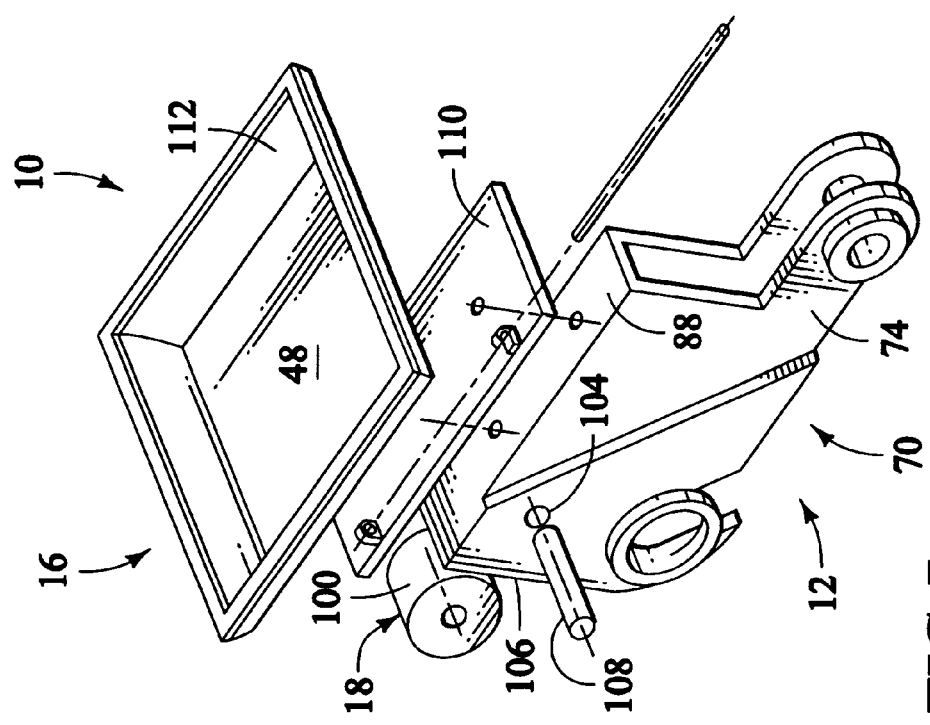
FIG. 7 is an exploded perspective view of a third embodiment of the spool link.
Figure 9:
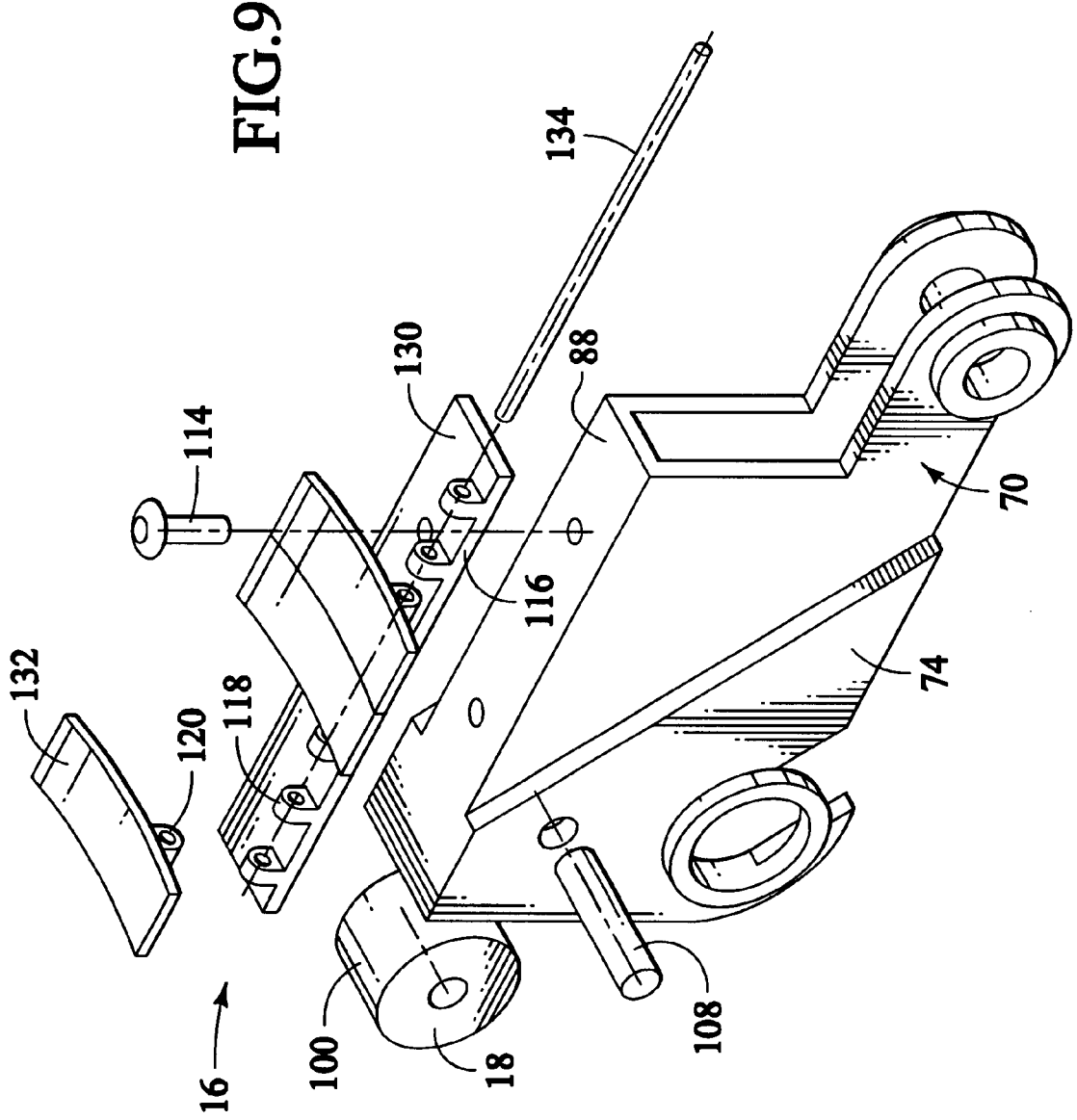
FIG. 9 is an exploded perspective view of a fourth embodiment of the spool link.

However, this lower chassis portion 70, is capable of engaging various embodiments of a saddle 48, which are engageable thereto at a position overlying the tongue 90 of the spool portion 72, as will be more clearly understood after a review of FIG. 7–9.

Also, it will be understood that the lower chassis portion 70 includes known structure for engaging the lower chassis portion of adjacent spool links 10.

In FIGS. 7 and 8, a further embodiment of a spool link 10 is illustrated.

In this embodiment, the body 12 only comprises a lower chassis portion 70 which has certain similarities to that of the embodiment of FIG. 6. For example, the chassis portion 70 includes two side walls 74 which depend in spaced apart, parallel fashion from a horizontal platform 88 engaged therebetween, with each wall 74 incorporating structure for engaging adjacent spool links 10 thereto, while again lacking structures necessary for pivoting of a saddle 48.

In perusing the end view of FIG. 8, the platen 110 is seen to be wider than the platform 88, extending laterally outwardly thereabove, with one "dangling" side edge 116 thereof incorporating hinge portions 118 which cooperate with coacting hinge portions 120 provided on an undersurface 122 of the saddle 48, by means of which, when the hinge portions 118 and 120 are engaged together in suitable manner, the saddle may be pivoted toward and outwardly of the side edge 116.

It will be understood that the saddle 48 of the disclosed embodiment is proposed to be significantly wider than the platen 110 therebeneath, for engaging larger objects thereon, although this should not be construed as limiting, inasmuch as dimensions of the saddle 48 are easily modifiable to accommodate dimensions of an object to be carried thereby, within obvious limits of the system structure.

Inasmuch as the hinge portions 118 and 120 engage at a position above the platen 110, in order to maintain a horizontal orientation for the saddle 48, at least one elevating foot 124 is provided on the underside 122 of the saddle 48, at a position spaced from the hinge portions 118 and 120 while still being capable of resting on the platen 110, the foot 124 being of a vertical extent equal to that of the hinge portions 118 and 120.

It will be understood, of course, that if the hinge portions 118 and 120 were created in a manner to be coplanar with, or to lie below, the level of the platen 110, the foot 124 would be unnecessary.

Further, because of the existence of forms of saddle actuators other than those including a ramp and cooperating log which rides thereupon, such as, for example, vertically oriented pins (not shown) etc., which could directly engage a suitable surface of a saddle 48 for causing pivoting thereof about any suitable form of hinge, the provision of an actuator need not necessarily be considered as a required structure for the spool link 10.

Still further, it will be understood, referring back to FIG. 6, that there is no need to preclude the potential of using a cradle 48, such as that illustrated in FIGS. 7–9, in combination with the structures of FIG. 6, requiring only a dimensional modification to avoid interference between the cradle 48 and the center ring 18 thereof.

Turning now to a final illustrated embodiment of FIG. 9, it will first be seen that the structure of the lower chassis portion 70, is substantially identical to that of the previous embodiment. Here, however, the cradle 16 is seen to include a platen 130 which, rather that being wider, is approximately of the same dimensions as the platform 88 of the chassis portion 70 which it overlies. This platen 130 includes a plurality of spaced apart hinge portions 118 thereon which are aligned along one side edge 116 of the platen 130, between and to which a hinge portion 120 of each of a plurality of separately pivotable cusp shaped saddle sections 132 is engaged by a pin 134 extending the length of the platen 130. Each cusp shaped saddle section 132 extends laterally across and beyond each side edge of the chassis portion 70, with a lowermost point of each section 132 being approximately centered over the lateral extent of the platen 130.

Again, this embodiment lacks integral actuator structure, which, again should not be construed as limiting. It should be understood, however, that an undulating, or wave motion pivoting of the cradle 16 can be produced using this embodiment, if the saddle sections 132 are sequentially, rather than simultaneously, pivoted. Further, it will be understood that the diminutive center ring 18, does not need to be of any greater radial extent in spool link 10 embodiments where rotational contacts with the object carried by the cradle 16 is not required.

As described above, the various embodiments of a spool link 10 as generally disclosed herein provide a number of advantages, some of which have been described above, and others of which are inherent therein. Also, modifications may be proposed to the spool link 10 without departing from the teachings herein. Accordingly, the scope of the invention is only to be limited as necessitated by the accompanying claims.

I claim:

1. A conveyor link for use in a monorail conveyor system comprising:

a body made of at least one piece and including at least a pair of engaged substantially vertical, spaced-apart side walls;

a center ring rotatably engaged between said side walls, said center ring having an axis of rotation perpendicular to said side walls; and a cradle comprising at least a horizontally oriented saddle extending at least between said side walls at a predefined position;

wherein said side walls are engaged by a platform engaged therebetween, said platform engaging an upper edge of each of said side walls;

wherein said cradle is pivotably engaged upon said platform; and wherein said body has a forward end and a rearward end, the forward end being configured to engage and retain the rearward end of an adjacent, substantially identical conveyor link, and the rearward end likewise being configured to engage and retain the forward end of an adjacent, substantially identical conveyor link, whereby a plurality of such substantially identical conveyor links can be linked together to form a chain.

2. The conveyor link of claim 1 wherein said cradle comprises a single platelike structure pivotable at least to one side of said body.

3. The conveyor link as defined in claim 1, wherein the body is formed as a single, unitary component having an inverted U shape.

4. The conveyor link as defined in claim 1, wherein:

the forward end of the body includes a laterally projecting forward projection, and the rearward end of the body includes a laterally projecting rearward projection;

the forward projection is sized and configured to engage and retain the rearward projection of an adjacent, substantially identical conveyor link; and the rearward projection is sized and configured to engage and retain the forward projection of an adjacent, substantially identical conveyor link.

* * * * *